Figure 1:
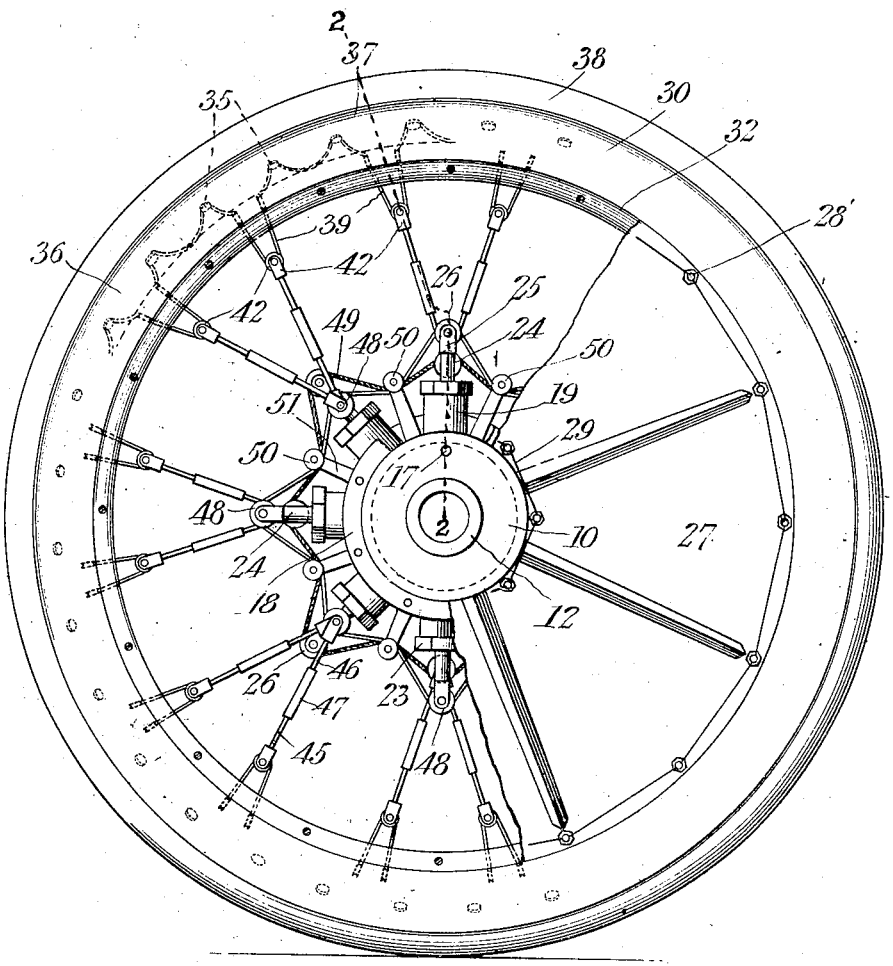

E. A. FINZER.
SPRING WHEEL.
APPLICATION FILED NOV. 1, 1911.

1,048,055.

Patented Dec. 24, 1912.
2 SHEETS—SHEET 1.

WITNESSES

INVENTOR
Estle A. Finzer
By H. S. Woodward
Attorney

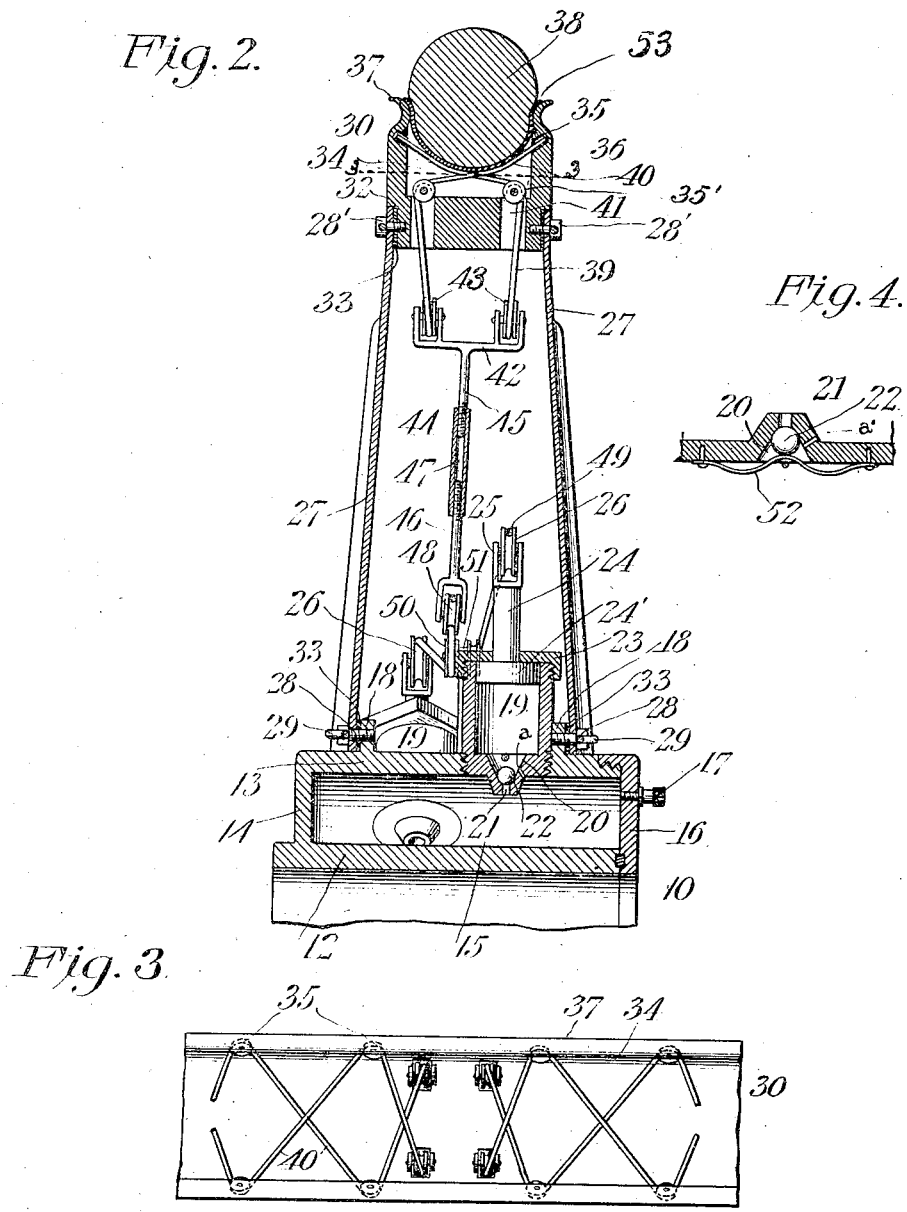

UNITED STATES PATENT OFFICE.

ESTLE ARCHIE FINZER, OF HICKSVILLE, OHIO.

SPRING-WHEEL.

1,048,055.   Specification of Letters Patent.   Patented Dec. 24, 1912.

Application filed November 1, 1911. Serial No. 657,916.

*To all whom it may concern:*

Be it known that I, ESTLE A. FINZER, a citizen of the United States, residing at Hicksville, in the county of Defiance and State of Ohio, have invented new and useful Improvements in Spring-Wheels, of which the following is a specification.

This invention relates to resilient tires and the like suitable for motor vehicles, and has for an object to provide means to support resiliently a tire which in itself need not be resilient, or at least need not be of cushion forming material.

An important object is to provide a central pneumatic pressure chamber in a wheel and means to support movably a tire and communicate the force of concussions received by the tire to the compressed air.

Other objects and advantages will be apparent from the following description and from the drawings, in which:

Figure 1 is a side view of the wheel engaged with a road surface, with parts broken away, Fig. 2 is a cross section thereof on the line 2—2 of Fig. 1, Fig. 3 is a similar view on the line 3—3 of Fig. 1, Fig. 4 is a detail of the spoke construction.

There is shown a hub 10, which may be secured in any suitable manner upon an axle shaft, and includes the inner sleeve 12 having the concentric cylindrical outer wall 13 spaced therefrom and joined integrally therewith by the inner end wall 14, the chamber 15 thus formed being hermetically closed at the forward end by the cap 16, having the air valve 17 therethrough.

The hub is provided with peripheral flanges 18 therearound adjacent the respective ends of the hub between which there are two series of openings through the wall 13, arranged in staggered relation around the hub. These openings are threaded, and engaged therein are cylinder elements 19 headed at their inner ends and having conical recesses 20 on their inner sides, communicating with the inner reduced portion of which there are concentric passages 21 and by-passages *a*, opening into the chamber 15. Balls 22 are suitably caged in the recesses to be forced to a seat over the passages by sudden movement of air from the cylinders to the chamber 15 as will be described. Centrally apertured nut caps 23 are engaged on the outer ends of the cylinders 19 reciprocating in which openings are the stems 24 of pistons 24′ fitted in the cylinders. The stems are forked as at 25 at their outer ends, and carry revolubly therebetween the pulley wheels 26.

Secured to the respective flanges 18 on the hub there are the annular slightly dished plates 27, their convex portions presented outwardly, and each having a radial series of spoke-like ribs pressed therein to increase their rigidity and the strength of the wheel. The flanges are apertured at suitable intervals, and bolts 28 are engaged through registering apertures in the plates and threaded in those of the flanges, the heads of the bolts being transversely apertured and a wire 29 engaged continuously through the series at each side of the wheel.

An annular body or rim 30 is carried between the plates 27, being rabbeted on each side at its inner edges forming shoulders 32, the edge portions of the plates being set in the rabbets and abutting snugly against the shoulders. It should be noted that the inner edges of the plates also abut forcibly against the peripheral surface of the hub. The plates are secured to the rim by bolts 28′ wired similarly to those 28, and beneath the plates at each point of securement, there are felt or other dust excluding washers 33.

The rim 30 has a deep channel 34 formed therearound, in the sides of which are suitably mounted rollers or pulleys 35. The sides of the channel are in the form of parallel flanges 36. The outer portions are provided with a resilient portion 37 tending to bear inward against a tire 38 disposed therebetween for radial sliding movement between the flanges. The pulleys are closely spaced all around the rim, and are utilized to carry two cables 40 encircling the wheel within the channel of the rim and engaged over the rollers at each side of the rim alternately in serpentine fashion, except that at intervals loops 39 of the cables are extended inwardly through suitable pairs of passages 41 in the rim. The cables are both looped thus adjacent the transversely disposed yokes 42 carrying at each side pulleys 43 receiving the bight of respective loops 39 therearound. The cables 40 thus form a bed upon which the tire 38 rests, spaced some distance outward of the bottom of the channel 34, and depression of the tire in the rim causes a considerable take-up in the loops 39 whereby the yokes are drawn outwardly. The yokes have extensible stems 44 comprising an exteriorly threaded outer portion 45 and a similar inner portion 46 each engaged in the right-and-left threaded sleeve 47. At the inner end of the inner section 46 there is carried a pulley 48. Engaged over the pulleys 26 of the piston stems there are continuous cables 49, and these cables also engage over alternate pulleys 48 at the inner ends of the yoke stems. Each cable intermediately of the pulleys 26 and 48 is engaged under a pulley 50 of which one is carried at each side of radial standards 51 or spokes, intermediately of the cylinders.

In use a concussion of the tire by engagement with the road surface will cause depression of the cables 40 within the rim, which movement will be communicated through the cables, the yokes 42, and cables 49 to the pistons, which, supported by the highly compressed air in the chamber 15 of the hub and the cylinders, will greatly lessen or entirely absorb the shock to the vehicle body carried by the wheel.

The provision of the balls 22 causes a rapid acceleration of the compression of air in the cylinders which is gradually relieved through the reduced bypassages, whereby an additional shock absorbing element is produced by the pneumatic cushion device.

In Fig. 4 there is shown a modification of the arrangement of the ball with respect to the passage leading from the chamber 15 to the cylinder. Here, the recess, indicated by the numeral 20' is formed next to the chamber 15, the passage 21' opening centrally of the recess and leading to the cylinder above, and the bypass opening a' laterally of the ball seat forms open, though restricted, communication between the cylinder and chamber 15. A spring 52 is secured to the bottom of the cylinder and is provided with a bowed portion bearing against the ball 22' within the recess to hold it yieldably seated over the passage 21'. The operation of this device is the reverse of that before described for controlling passage of air between chamber 15 and cylinders, the object being to allow free compressive action of the pistons when the tire is pressed into the rim, and prevent the wheel from being thrown upward suddenly by the rapid return of the piston by expansion of air in the cylinder. Thus, the sudden movement of the piston under concussion of the tire will be resisted by the compressed air, a portion of which, if not all will be expelled from the cylinder through the passage 21', the ball being displaced thereby, and the return of the air retarded by the interposition of the ball acting as a check valve, necessitating the passage of all air through the bypass a'.

An important advantage to be noted in connection with this device is the rigidity of the wheel, the incorporation of the resiliently movable parts not interfering with its strength, and should the pneumatic elements become entirely deranged, and inoperative, the wheel would still provide an efficient cushion tire, as the tire 38 has its tread portion disposed outwardly of the retaining flanges even when at the inner limit of its movement.

To protect the tire from chafing and for engagement resiliently against the resilient portions 37 of the rim flanges a suitable sole 53 of proper material is disposed thereunder between it and the cables and the flanges.

What is claimed is:

1. A wheel of the class described comprising a hub having an air chamber therein, a plurality of radial cylinders thereon in communication with the air chamber, pistons reciprocable in the cylinders for compression of air in the chamber, piston rods connected therewith, pulleys at the end of the rods outwardly of the cylinders, spokes carried by the hub, pulleys on certain of the spokes inwardly of the first named pulleys, flexible members engaged continuously over the first named pulleys and under the second named pulleys, radially movable links, pulleys carried thereby engaged inwardly of the cables intermediately of the second named pulleys for inward movement of the pistons upon outward movement of the links, a rim carried outwardly of the spokes having a guide channel therein, a tire member therein movable inwardly and outwardly, movable means engaged within the tire and connected with the links for outward movement of the links upon inward movement of the tire.

2. In a device of the class described, a chambered hub, means for admitting air thereinto, a plurality of radial cylinders carried by the hub and in communication with the chamber thereof, pistons reciprocable in the cylinders adapted to be held at the outer limit of their movement by compressed air in the hub and cylinders, a rim element carried outwardly of the cylinders, a radially movable element thereon, connections between the radially movable element and the pistons for compression of air in the cylinders upon inward movement of the radially movable element, and means for retarding passage of air between the hub and cylinders in one direction.

3. In a device of the class described, a hub having an annular chamber, a plurality of radial threaded openings communicating with the chamber, cylinder members having inner headed ends engaged in said openings, the heads having a central recess therein and an axial passage opening from the recess through the head, a ball loosely disposed in the recess, means for retaining the ball in operative position, a piston reciprocable in the cylinder, means for admitting compressed air to the chamber of the hub, means for limiting the outward movement of the piston, a radially movable road engaging member, and connections between the last named member and the piston.

4. In a device of the class described, a wheel comprising a chambered hub, a plurality of cylinders carried thereby having apertured heads in communication with the chamber, check valve means operable in one direction for the control of fluid passing through the apertures, a relief passage in free communication between the chamber and the cylinder, pistons reciprocable in the cylinders, means for introducing compressed air into the chamber, a radially movable tire element, and connections between tire element and the pistons.

In testimony whereof I have hereunto set my hand in presence of two subscribing witnesses.

ESTLE ARCHIE FINZER.

Witnesses:
 CHAS. GILLETTE,
 GEO. PEEPER.